(12) United States Patent
Richardson

(10) Patent No.: US 8,779,909 B1
(45) Date of Patent: Jul. 15, 2014

(54) VEHICLE BASED COMMUNICATION SYSTEM

(76) Inventor: Gus C. Richardson, Palm Harbor, FL (US)

(*) Notice: Subject to any disclaimer, the term of this patent is extended or adjusted under 35 U.S.C. 154(b) by 301 days.

(21) Appl. No.: 12/927,818

(22) Filed: Nov. 24, 2010

(51) Int. Cl.
*B60Q 1/00* (2006.01)

(52) U.S. Cl.
USPC .................................................. 340/425.5

(58) Field of Classification Search
USPC ........ 340/425.5, 426.16, 995; 701/1; 359/630
See application file for complete search history.

(56) References Cited

U.S. PATENT DOCUMENTS

| | | | | |
|---|---|---|---|---|
| 5,519,410 A | * | 5/1996 | Smalanskas et al. | 345/7 |
| 2007/0112444 A1 | * | 5/2007 | Alberth et al. | 700/32 |
| 2007/0205875 A1 | * | 9/2007 | De Haan | 340/425.5 |
| 2007/0233376 A1 | * | 10/2007 | Gershony et al. | 701/211 |
| 2008/0079753 A1 | * | 4/2008 | Victor et al. | 345/660 |
| 2011/0187547 A1 | * | 8/2011 | Kweon | 340/670 |
| 2011/0241853 A1 | * | 10/2011 | Harbach et al. | 340/425.5 |

* cited by examiner

*Primary Examiner* — Phung Nguyen

(57) ABSTRACT

A touch screen/keyboard is positionable within a vehicle. The touch screen/keyboard has a cradle. A projector is positioned on a dashboard of the vehicle. In this manner digital data is displayed on a windshield of the vehicle. A receiver couples the touch screen/keyboard and the projector. In this manner digital data is received and transmitted. A computer couples the touch screen/keyboard and the receiver. Further in this manner digital data is received and transmitted.

1 Claim, 1 Drawing Sheet

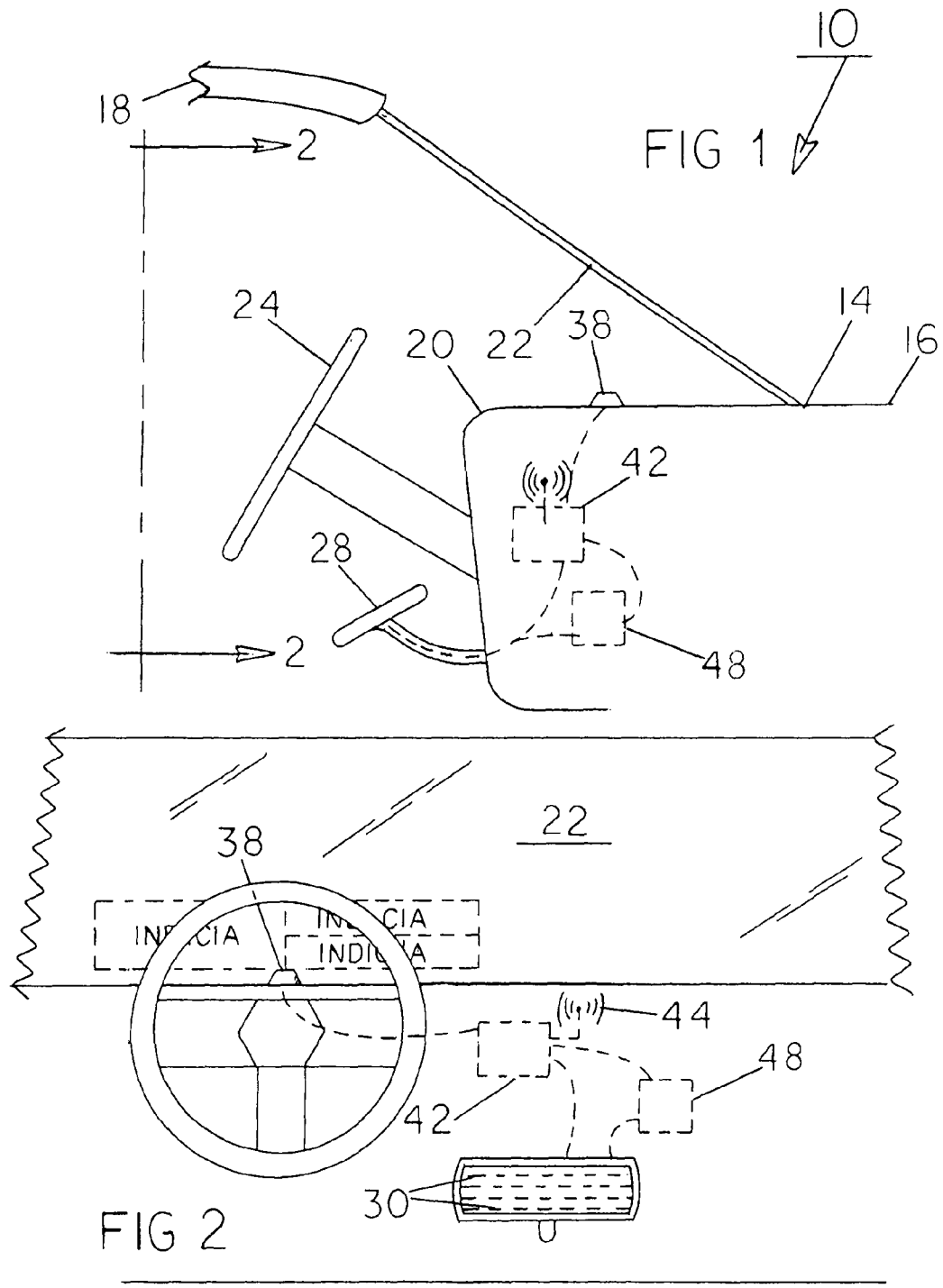

VEHICLE BASED COMMUNICATION SYSTEM

BACKGROUND OF THE INVENTION

Field of the Invention

The present invention relates to a vehicle base communication system and more particularly pertains to sending and receiving text messages through heads up displaying and selective inputting, the sending and receiving and the displaying and inputting being done in a safe, convenient and economical manner.

SUMMARY OF THE INVENTION

In view of the foregoing disadvantages inherent in the known types of communication systems of known designs and configurations now present in the prior art, the present invention provides an improved vehicle based communication system. As such, the general purpose of the present invention, which will be described subsequently in greater detail, is to provide a new and improved vehicle based communication system and method which has all the advantages of the prior art and none of the disadvantages.

To attain this, the present invention essentially comprises a vehicle based communication system. First provided is a vehicle. The vehicle has a forward end. The vehicle has a rearward end. The vehicle includes a dashboard. The vehicle includes a windshield. The windshield extends laterally across the width of the vehicle. The vehicle also includes a rearwardly extending steering wheel. The steering wheel is located to one side of the dashboard and windshield.

A standard touch screen/keyboard is provided. The standard touch screen/keyboard is coupled to a laterally intermediate region of the dashboard. The touch screen/keyboard extends rearwardly. The standard touch screen/keyboard has alpha-numeric keys. The keys are adapted to be contacted by a user. In this manner text messages are created. The standard touch screen/keyboard has a cradle.

Provided next is a projector. The projector extends upwardly from the dashboard forwardly of and in longitudinal alignment with the steering wheel. The projector is adapted to project text messages onto the windshield centered in front of a user sitting at the steering wheel. The projected text messages include a plurality of optional formats. The optional formats include horizontally and vertically spaced messages. Note FIG. 2.

Further provided is a receiver. The receiver is positioned within the dashboard. The receiver wirelessly couples the standard touch screen/keyboard and the projector. In this manner digital data is transmitted from the standard touch screen/keyboard to the projector. The receiver includes an antenna. In this manner digital data is received from the standard touch screen/keyboard and from remote communication devices. Further in this manner the received digital data is transmitted to the projector and displayed as messages. The windshield has a height and a width. Each message has a height and a width. The windshield has a top 67 percent devoid of messages and a bottom 33 percent adapted to receive messages covering the majority of the bottom 33 percent of the windshield in front of the steering wheel. The width of the message is greater than the height of the messages.

Provided last is a computer. The computer is positioned within the dashboard. The computer wirelessly couples the standard touch screen/keyboard and the receiver. In this manner digital data is transmitted from the standard touch screen/keyboard to the computer and then to the projector. The computer is adapted to receive digital data from the standard touch screen/keyboard. The computer is further adapted to transmit the received digital data to the receiver and then to the projector to transmit digital data through the standard touch screen/keyboard and receiver and projector. In this manner data is displayed on the windshield.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle based communication system which has all of the advantages of the prior art communication systems of known designs and configurations and none of the disadvantages.

It is another object of the present invention to provide a new and improved vehicle based communication system which may be easily and efficiently manufactured and marketed.

It is further object of the present invention to provide a new and improved vehicle based communication system which is of durable and reliable constructions.

An even further object of the present invention is to provide a new and improved vehicle based communication system which is susceptible of a low cost of manufacture with regard to both materials and labor, and which accordingly is then susceptible of low prices of sale to the consuming public, thereby making such vehicle based communication system economically available to the buying public.

Even still another object of the present invention is to provide a vehicle based communication system for sending and receiving text messages through heads up displaying and selective inputting, the sending and receiving and the displaying and inputting being done in a safe, convenient and economical manner.

Lastly, it is an object of the present invention to provide a new and improved vehicle based communication system. A touch screen/keyboard is positionable within a vehicle. The touch screen/keyboard has a cradle. A projector is positioned on a dashboard of the vehicle. In this manner digital data is displayed on a windshield of the vehicle. A receiver couples the touch screen/keyboard and the projector. In this manner digital data is received and transmitted. A computer couples the touch screen/keyboard and the receiver. Further in this manner digital data is received and transmitted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational of a heads up texting system with computer and touch screen/keyboard constructed in accordance with the principles of the present invention.

FIG. 2 is a schematic illustration of the system shown in FIG. 1.

The same reference numerals refer to the same parts throughout the various Figures throughout the primary and alternate embodiments of the invention.

DESCRIPTION OF THE PREFERRED EMBODIMENT

With reference now to the drawings, and in particular to FIG. 1 thereof, the preferred embodiment of the new and improved vehicle based communication system embodying the principles and concepts of the present invention and generally designated by the reference numeral 10 will be described.

The present invention, the vehicle based communication system 10 is comprised of a plurality of components. Such components in their broadest context include a touch screen/keyboard, a projector, a receiver and a computer. Such components are individually configured and correlated with respect to each other so as to attain the desired objective.

First provided is a vehicle 14. The vehicle has a forward end 16. The vehicle has a rearward end 18. The vehicle includes a dashboard 20. The vehicle includes a windshield 22. The windshield extends laterally across the width of the vehicle. The vehicle also includes a rearwardly extending steering wheel 24. The steering wheel is located to one side of the dashboard and windshield.

A standard touch screen/keyboard 28 is provided. The standard touch screen/keyboard is coupled to a laterally intermediate region of the dashboard. The touch screen/keyboard extends rearwardly. The standard touch screen/keyboard has alpha-numeric keys 30. The keys are adapted to be contacted by a user. In this manner text messages are created. The standard touch screen/keyboard has a cradle 32.

Provided next is a projector 38. The projector extends upwardly from the dashboard forwardly of and in longitudinal alignment with the steering wheel. The projector is adapted to project text messages onto the windshield centered in front of a user sitting at the steering wheel. The projected text messages include a plurality of optional formats. The optional formats include horizontally and vertically spaced messages. Note FIG. 2.

Further provided is a receiver 42. The receiver is positioned within the dashboard. The receiver wirelessly couples the standard touch screen/keyboard and the projector. In this manner digital data is transmitted from the standard touch screen/keyboard to the projector. The receiver includes an antenna 44. In this manner digital data is received from the standard touch screen/keyboard and from remote communication devices. Further in this manner the received digital data is transmitted to the projector and displayed as messages. The windshield has a height and a width. Each message has a height and a width. The windshield has a top 67 percent devoid of messages and a bottom 33 percent adapted to receive messages covering the majority of the bottom 33 percent of the windshield in front of the steering wheel. The width of the message is greater than the height of the messages.

Provided last is a computer 48. The computer is positioned within the dashboard. The computer wirelessly couples the standard touch screen/keyboard and the receiver. In this manner digital data is transmitted from the standard touch screen/keyboard to the computer and then to the projector. The computer is adapted to receive digital data from the standard touch screen/keyboard. The computer is further adapted to transmit the received digital data to the receiver and then to the projector to transmit digital data through the standard touch screen/keyboard and receiver and projector. In this manner data is displayed on the windshield.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle based communication system (10) for sending and receiving text messages through heads up displaying and selective inputting, the sending and receiving and the displaying and inputting being done in a safe, convenient and economical manner, the system comprising, in combination:

a vehicle (14) having a forward end (16) and a rearward end (18), the vehicle including a dashboard (20) and a windshield (22) extending laterally across the width of the vehicle, the vehicle also including a rearwardly extending steering wheel (24) located to one side of the dashboard and windshield;

a standard touch screen/keyboard (28) coupled to a laterally intermediate region of the dashboard and extending rearwardly thereof, the standard touch screen/keyboard having alpha-numeric keys (30) adapted to be contacted by a user to create text messages, the standard touch screen/keyboard having a cradle (32;

a projector (38) extending upwardly from the dashboard forwardly of and in longitudinal alignment with the steering wheel, the projector adapted to project text messages onto the windshield centered in front of a user sitting at the steering wheel, the projected text messages including a plurality of optional formats including horizontally and vertically spaced messages;

a receiver (42) positioned within the dashboard, the receiver wirelessly coupling the standard touch screen/keyboard and the projector for transmitting digital data from the standard touch screen/keyboard to the projector, the receiver including an antenna (44) for receiving digital data from the standard touch screen/keyboard and from remote communication devices and for transmitting the received digital data to the projector for display as messages, the windshield having a height and a width, each message having a height and a width, the windshield having a top 67 percent devoid of messages and a bottom 33 percent adapted to receive messages covering the majority of the bottom 33 percent of the windshield in front of the steering wheel, the width of the message being greater than the height of the message;

a computer (48) positioned within the dashboard, the computer wirelessly coupling the coupling the standard touch screen/keyboard and the receiver for transmitting digital data from the standard touch screen/keyboard to the computer and then to the projector, the computer adapted to receive digital data from the standard touch screen/keyboard and adapted to transmit the received digital data to the receiver and then to the projector to transmit digital data through the standard touch screen/keyboard and receiver and projector for display on the windshield.

\* \* \* \* \*